US010262379B2

(12) United States Patent
Hosseini et al.

(10) Patent No.: US 10,262,379 B2
(45) Date of Patent: Apr. 16, 2019

(54) DISPLAYING SOCIAL NETWORKING INFORMATION BASED ON IDENTIFIED ENTITY

(71) Applicant: Microsoft Technology Licensing, LLC, Redmond, WA (US)

(72) Inventors: Farid Hosseini, San Francisco, CA (US); Mohammad Omid Monshizadeh, Cupertino, CA (US); Gloria Lau, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 599 days.

(21) Appl. No.: 13/663,844

(22) Filed: Oct. 30, 2012

(65) Prior Publication Data

US 2014/0122653 A1 May 1, 2014

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC ......... G06F 17/30389; G06F 17/30528; G06F 17/30604; G06F 17/30699; G06F 17/30702; G06F 17/30861; G06F 17/30864; G06F 17/30867; G06F 17/30893; G06F 17/30899; G06F 21/6227; G06F 21/6254; G06Q 10/00; G06Q 10/02; G06Q 10/107; G06Q 10/1053; G06Q 20/3672; G06Q 30/00; G06Q 30/02; G06Q 30/10; G06Q 30/0213; G06Q 30/0215; G06Q 30/269; G06Q 50/01; H04L 51/28; H04L 51/32; H04L 67/02; H04L 67/10; H04L 67/22; H04L 67/306; H04N 7/17318; H04N 21/222
See application file for complete search history.

(56) References Cited

U.S. PATENT DOCUMENTS

2006/0136419 A1* 6/2006 Brydon ................ G06Q 10/107
2007/0198510 A1* 8/2007 Ebanks .................. G06Q 30/02
2009/0182589 A1* 7/2009 Kendall ................. G06Q 10/02 705/5
2010/0082695 A1* 4/2010 Hardt ........................... 707/798
2010/0185630 A1* 7/2010 Cheng et al. ................. 707/756
2010/0281364 A1* 11/2010 Sidman ......................... 715/713
2011/0125759 A1* 5/2011 Querel .................... H04L 51/32 707/748

(Continued)

*Primary Examiner* — Clayton R Williams
*Assistant Examiner* — Michael Li
(74) *Attorney, Agent, or Firm* — Schwegman Lundberg & Woessner, P.A.

(57) ABSTRACT

A system and computing instructions may include a user device, a social network database, and a processor. The user device may include a user interface configured to display a web browser. The social network database may be configured to store social network information related to an entity. The processor may be configured to identify the entity based on content of a webpage displayed on the web browser of the user device, obtain social network information related to the entity from the social network database based on a social network relationship between the user and the entity, and display the social network information on the web browser of the user device.

19 Claims, 4 Drawing Sheets

(56) References Cited

U.S. PATENT DOCUMENTS

2011/0208822 A1* 8/2011 Rathod .................. G06Q 30/02
709/206
2011/0265011 A1* 10/2011 Taylor et al. ................. 715/751
2011/0276396 A1* 11/2011 Rathod ...................... 705/14.49
2011/0276507 A1* 11/2011 O'Malley .............. G06Q 10/00
705/321
2012/0084127 A1* 4/2012 Nkrumah ........... G06Q 30/0213
705/14.15
2012/0150888 A1* 6/2012 Hyatt ................ G06F 17/30528
707/758
2013/0254286 A1* 9/2013 Jean-Claude ...... G06Q 20/3672
709/204

* cited by examiner

DISPLAYING SOCIAL NETWORKING INFORMATION BASED ON IDENTIFIED ENTITY

TECHNICAL FIELD

The subject matter disclosed herein generally relates to identifying an entity and displaying related social networking information on a web browser.

BACKGROUND

Many users of the Internet and other networks are members of one or more social networks. Such users can include individuals and organizations, including companies and corporations. The utilization of social networks can be generally limited to circumstances when the social network itself is accessed. Consequently, for a first user to obtain or learn social network information about a second user, the first user may generally proceed to the social network on which the second user has posted information and conventionally look up me second user's social network profile.

BRIEF DESCRIPTION OF THE DRAWINGS

Some embodiments are illustrated by way of example and not limitation in the figures of the accompanying drawings.

DETAILED DESCRIPTION

Example methods and systems are directed to provision of a consolidated update. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In conventional Internet usage, a user inters and views a web page on a web browser. The web browser can download and display the selected web page until the user exits the web browser or selects another web page. Conventionally, the information on the web page can be simply displayed on the web browser without respect to the nature of the content of the web page; the web browser may simply display the content without any particular sensitivity to the nature of the content. Consequently, to the extent that the web page includes information about an entity that possesses or relates to social networking information, such social networking information may have to be separately and independently obtained by the user.

The present disclosure provides an ability to identify an entity that is included in the content of a web page that is displayed or about to be displayed on a web browser. The identity of the entity can be cross-referenced against a social network database and information related to the entity obtained from the database. The social network information can then be displayed on the web browser alongside the web page. The social network may thereby be presenting the user of the web page with social networking information relevant to the content on the web page, such as relevant job information, product descriptions, social networking messages, and other potentially pertinent information.

Figure 1:
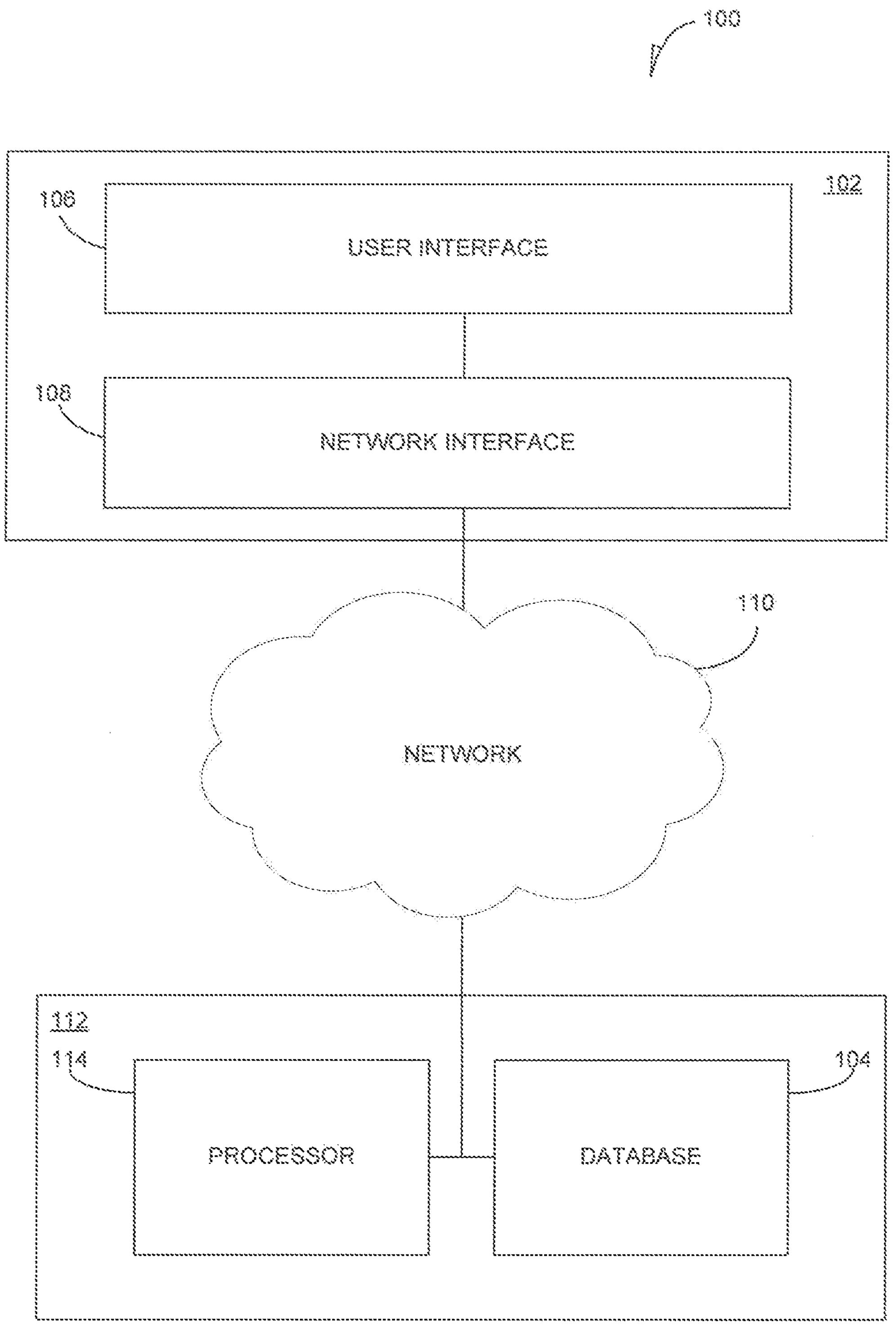
FIG. 1 is a block diagram of a system including a user web browsing device and a social network database.

FIG. 1 is a block diagram of a system 100 including a user web browsing device 102 and a social network database 104. The user device 102 can be a personal computer, netbook, electronic notebook, smartphone, or any electronic device known in the art that is configured to display web pages. The user device 102 can include a user interlace 106 that can display a web browser that can display a web page. The user interface 106 can also receive a user input to select and interact with the web page. The user device 102 can also include a network interface 108 that is communicatively coupled to a network 110, such as the Internet.

The social network database 104 can be a component of a server 112 that is communicatively coupled to the network 110. The server 112 can be an individual server or a cluster of servers, and can be configured to serve the social network to which the database 104 corresponds. The database 104 can be stored on one or more electronic data storage devices, such as a hard drive, and can be maintained by a processor of the server 112. The social network database 104 can store information related to members of the social network. For instance, for an entity who is an individual person, the member's information can include name, age, gender, profession, location, activities, likes and dislikes, and so forth. For an entity that is an organization, such as a company, the information can include name, offered products for sale, available job postings, organizational interests, forthcoming activities, and the like.

The server 112 is communicatively coupled to the network 110. The server 112 optionally includes a processor 114 as known in the art that can interface with the database 104, utilize information from the database 104 and other sources, and produce an output based on the data as obtained and programs and applications. The processor 114 can be a component of another device of the system 100 rather than the server 112 specifically and can be communicatively coupled to the server 112. Optionally, the user device 102 includes a processor that can perform the same or similar functions to those of the processor 114 of the server 112. As described herein, processing functionality can be performed on the processor 114 of the server 112, can be performed on the processor of the user device 102, or can be shared or split between the processors of the user device 102, the server 112, and other computing resources that may be accessed fey or within the system 100.

The system 100 can include an application programming interface (API) configured to assess content of a web page displayed on the web browser displayed on the user interface 106 of the user device 102. The API can further identify an entity included in the content of the web page, obtain social network information relevant to the entity from tire database 104, and transmit the social network information to the user device 102 to be displayed on the user interlace 106. The API can ran on processing resources of the system 100 as described above, including, but not necessarily limited to, the processor 114. Alternative to an API, software and hardware of the system 100 can perform the function of the API without utilizing the API itself.

In an example, the API is or is based on the OpenCalais™ Web Service API by Thompson Reuters Corporation. In various examples, any of various versions of OpenCalais™ that are available at the time of this writing or will be available can be utilized. Alternatively, the API is a proprietary API than can parse content and extract relevant information. Such a proprietary API can be configured to identify entities pre-selected by the developer of the API and base information selection on networks corresponding to the entity.

Figure 2:
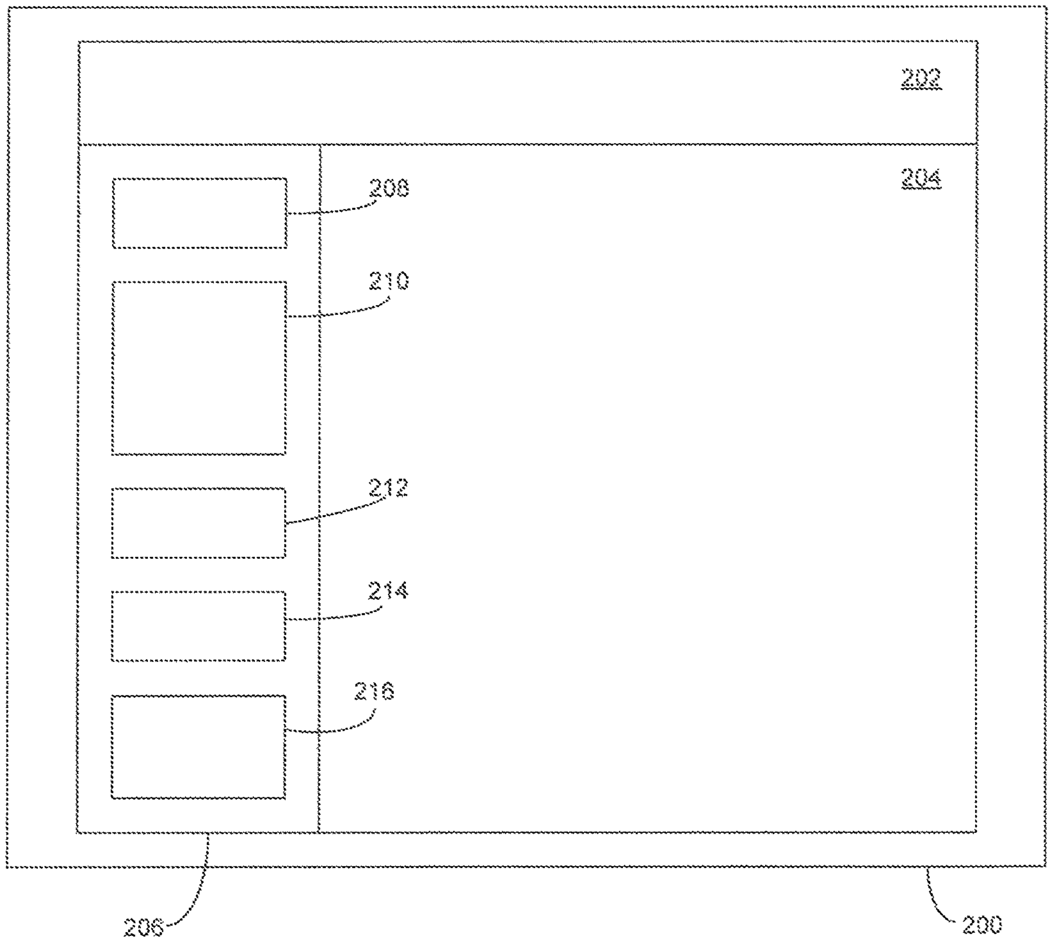
FIG. 2 is a diagram of an exemplary web browser that can be displayed on a user interface of a user device.

FIG. 2 is a diagram of an exemplary web browser 200 that can be displayed on the user interface 106 of the user device 102. The web browser 200 includes frames, including an interface frame 202, a web page frame 204, and a social network data frame 206. The frames 202, 204, 206 can occupy adjacent but separate areas of the web browser 200 concurrently. The interface frame 202 can include an address bar to input a uniform resource locator (URL), soft buttons for navigating between web pages, menus, and other interface resources well known in the art. The web page frame 204 can display a web page or other content based on data or information input info the web browser, such as a web page obtained via the Internet 110. As is known in the art, the web page frame 204 can display information not necessarily related to a web page or obtained over the network 110.

The data frame 206 can display social network information obtained from the database 104 by the API based on content displayed in the web page frame 204. The data frame 206 can include fields that display various social network data, including an entity name field 208, a social network graph field 210, a job field 212, and a data field 214. The entity name field 208 can include a name of the individual or organization that corresponds to the social network data.

The social network graph filed 210 can include a portion of a social network graph that illustrates a social network link between the user and the entity. A social network graph can illustrate social network connections between members of the social network that illustrates which members are socially connected with respect to one another and what secondary connections within the social network can lead from one member of the network to another member. The social network graph field 210 can thereby show social network connections between the user and entity as well as connections to other potentially relevant members of the social network, such as associates with similar interests of organizations with similar products or goals. In various examples, a social network connection can be a chosen association between two social network entities, variously known in the art as a "connection", a "friend", a "follow", and the like. A social network graph can incorporate multiple degrees of separation; two entities on the social network can have a connection by way of one or more third-party entities on the social network, such as a "friend-of-a-friend" connection.

The job field 212 can optionally show career information of an individual or information pertinent to available job openings at an organization. Individual career information can include both an area of profession as well as a current employer and/or a past employer. The job opening at an organization can include a job description and requirements.

The data field 214 can include miscellaneous information relating to the entity. Such miscellaneous information can include a social network description of the entity, such as an individual or organizational profile, specialties or offered products or services, social network postings such as messages, states updates, and the like, and other information that may be included in a social network profile of the entity. Information in the data frame 206 generally, and data in the can be obtained and provided to the web browser 200 for display in the data field 214 based in part on a relevance to the user, a popularity of the information, and a privacy setting of the entity. Data fields 208, 210, 212, 214 for which data is unavailable can be omitted from display. Additional data fields can be included, such as based on a user preference or selection via the web browser 200.

The data frame 206 can include data for multiple entities that are identified by the API in the web page frame 204. The data frame 206 can incorporate scrolling, separate, selectable pages for different entities, or other selection methods known in the art to provide information for multiple entities. The user may scroll or otherwise click between different entities. The data frame 206 can include an entity summary field 216 that can display basic information, such as an entity name, of some or all of the entities for which social network information is available.

In a first illustrative example of the operation of the system 100, a user of the user device 102 can select a web page on the web browser 200 via the user interface 106, such as by entering a URL on the interface frame 202 or selecting a hyperlink in the web page frame 204. The web page can be served to the user device 102 and displayed on the web page frame 204. Either as the web page is served to the user device 102 or upon the web page being displayed in the web page frame 204, the content of the web page can be analyzed by the API. In this illustrative example, the API Identifies a person's name in the webpage content and obtains social network information of the person from the database 104.

Obtaining the social network information can be automatic upon selection of a web site or can be based on a user option. When obtaining the social network information is automatic, the API can automatically assess each web page that is displayed on the web page frame 204. Where obtaining the social network information is at the user's option, the API can prompt the user, via the user interface 106, either on a ease-by-case basis or on a general basis whether to obtain and display social network information based on web page content. Additionally, the API can optionally prompt the user as to what fields 208, 210, 212, 214 the user would like to have displayed in the data frame 206.

The API can optionally determine if the person identified has a social network relationship with the user or is of sufficient significance or popularity to justify displaying related social network information to the user. A social network relationship can be based on degrees of separation in the social graph, such as one or two degrees of separation, or a fame, political significance, or business significance of the individual. The API can also determine if a privacy setting of the individual should result in some or all of the obtained social network information being blocked.

The social network information, obtained can be displayed in the data frame 206 in the pertinent fields 208, 210, 212, 214. Fields that do not have populated information for the individual can be omitted from the data frame 206. The social network information can remain displayed on the data frame 206 at least as long as the individual is still included in the content on the web page frame 204. The social network information can optionally be saved by the user and can be removed from the data frame 206 upon the individual no longer being included in the web page frame 204, such as because the user has selected a new web page that does not include reference to the individual.

In a second illustrative example of the operation of the system 100, the web page selected by the user includes information that tends to identify an organization. In the illustrative example, the organization is a company. The information in the web page can be a company name, a company product, or a company employee. In an example of the company or employee being identified, information relating to the company can be displayed in the data frame, such as a company profile, financial information, and company job postings that may be pertinent to the user. Additionally, relevant company products or services can be displayed. In an example of a company product being identified in the web page content, information relating to the product itself, such as pricing and consumer reviews, can be displayed along with or in substitute for the company information.

In an alternative illustrative example in which the organization is an educational institution or a social or advocacy-based organization, social network information such as organizational objectives and membership can be displayed. Social network information such as future meeting dates and times can additionally be displayed. The API can optionally prompt a user whether or not to display social or advocacy-based organizational information.

Identification of social network information of an entity based on content in a web page can be based on an assessed probability that certain information in the database 104 corresponds to the entity for which data is possessed. In an example, an individual's name used in the context of a use of a company name can result in social network information being identified based on the correlation between the individual and the individual's job status at the company. To the extent that, for instance, a common name cannot be linked to a particular person based on the context of the web page, the API can either decline to display social network information, can present summary information of various social network profiles that correspond to possible identities of the individual, or other optional actions to manage various possible profiles corresponding to a particular name.

The data frame 206 can be displayed upon the API obtaining the social network information related to an identified entity. To the extent that no information is obtained, the data frame 206 can be removed from the user interface 106 until information is obtained based on a web page that is loaded on the web browser 200. When the data frame 206 is not displayed, the web page frame 204 can be expanded to incorporate the space that would otherwise be occupied by the data frame 206.

In various examples, the data frame 206 can be provided by one of a variety of provisioning mechanisms. In an example, a client program can be installed on the user device 102 to operate as a background program in conjunction with the web browser 200. The client can provide automatic entity identification and obtaining of social network information as the user uses the web browser 200, or can provide on-demand entity identification based on a user selection. In an example, the data frame 206 can be provided by a browser extension, as known in the art, to directly expand the operations of the web browser 200 itself. In an example, the data frame 206 can be provided by a script stored as a URL of a web browser bookmark, known in the art as a bookmarklet, which can be selected for on-demand functionality by the user.

Figure 3:
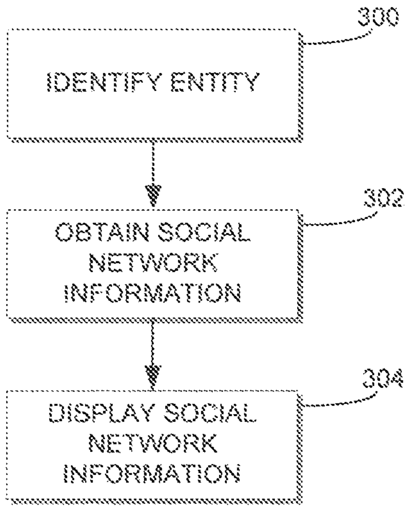
FIG. 3 is a flowchart for displaying social network information based on an identified entity.

FIG. 3 is a flowchart for displaying social network information based on an identified entity. The flowchart can utilize the system 100 or any other suitable system or device.

In operation 300, an entity is identified based on the content of a web page, such as is displayed in the web page frame 204 of the web browser 200. In various examples, the entity is at least one of an individual and an organization.

In operation 302, social network information related to the entity is obtained from the social network database 104 based on a social network relationship between the user and the entity. In various examples, the social network information is at least one of an entity name, a social network graph, a secondary entity related to the entity, a job posting that has been published and/or publicized by the entity, a product related to the entity, and a social network posting related to the entity. A secondary entity can be an entity that is related in some way to the entity, such, as the entity's employer, a subsidiary of the entity, a known alias of the entity, and so forth. In various examples, the information obtained is not only between the user and the entity. In such examples, public information relating to relationships between and among various users and various entities may also be incorporated when such information is available.

In various examples, the social network information is obtained based on at least one of a relevance to the user, a popularity of the social network information, and a privacy setting. The relevance to the user can be based, at least in part, on a comparison of the social network information with a user profile. For instance, where the user has established a profile that includes various professional characteristics (such as job title and experience), educational characteristics (such as an educational degree), and hobbies and interests, the profile of the user can be compared against the profile of the entity to determine relevance. Relevance can be determined based on a number of matches of profile characteristics overall or a number of high importance matches, such as a job title, experience, and educational degree in relation to requirements for a job posting.

The popularity of the social network information can be based on at least one of a number of times the social network information related to the entity has been accessed and a rating of a previous user of the social network information. The number of times the social network information has been accessed can be cumulative over a selectable period of time and can further be based on a type of user who has accessed the information, such as how many times a qualified candidate for a job posting has accessed the job posting. The ratings information can be based on a single user or a cumulative rating of multiple previous users of the information, in a manner well known in the art.

The privacy setting can be based on a privacy setting of the entity. In various examples, the privacy setting can limit access based on a social graph relationship, such as only to direct contacts of the entity or a particular number of degrees-of-separation on the social graph.

In operation 304, the social network information is displayed on the web browser 200 of the user. The social network information can be displayed on the browser 200 concurrently with the webpage. The social network information can be displayed concurrently by displaying the webpage in a first frame, such as the web page frame 204, of the web browser and the social network information in a second frame, such as the data frame 206, of the web browser.

Figure 4:
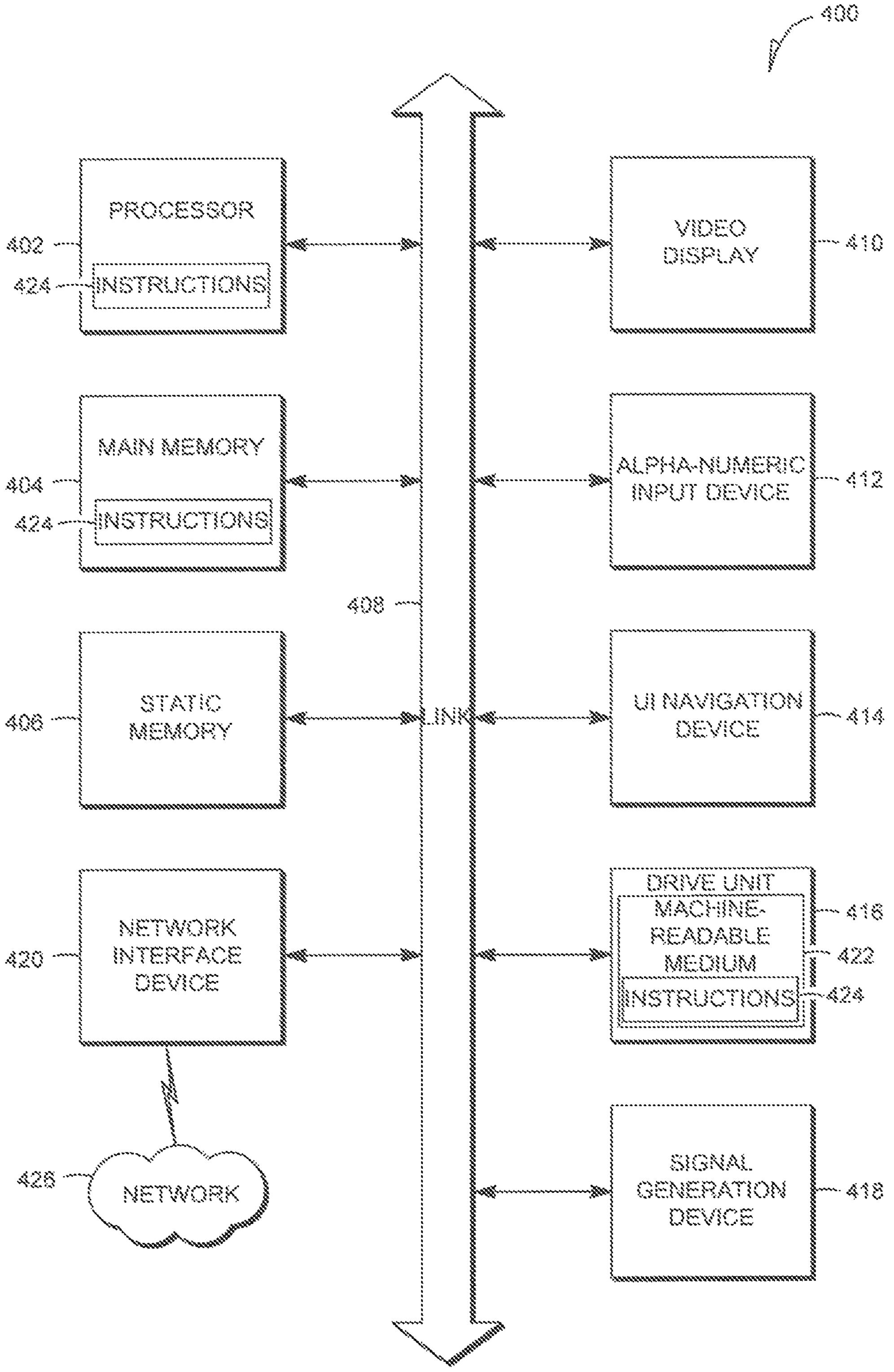
FIG. 4 is a block diagram illustrating components of a machine able to read instructions from a machine-readable medium.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system and within which instructions 424 (e.g., software) for causing the machine 400 to perform any one or more of the methodologies discussed herein may be executed. In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a peer-to-peer (or distributed) network environment. The machine 400 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include a collection of machines that individually or jointly execute the instructions 424 to perform any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The machine 400 may further include a graphics display 410 (e.g., a plasma display panel (PDP), a light emitting diode (LED) display, a liquid crystal display (LCD), a projector, or a cathode ray tube (CRT)). The machine 400 may also include an alphanumeric input device 412 (e.g., a keyboard), a cursor control device 414 (e.g., a mouse, a touchpad, a trackball, a joystick, a motion sensor, or other pointing instrument), a storage unit 416, a signal generation device 413 (e.g., a speaker), and a network interface device 420.

The storage unit 416 includes a machine-readable medium 422 on which is stored the instructions 424 (e.g., software) embodying any one or more of the methodologies or functions described herein. The instructions 424 may also reside, completely or at least partially, within the main memory 404, within the processor 402 (e.g., within the processor's cache memory), or both, during execution thereof by the machine 400. Accordingly, the main memory 404 and the processor 402 may be considered as machine-readable media. The instructions 424 may be transmitted or received over a network 420 via the network interface device 420.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 400), such that the instructions, when executed by one or more processors of the machine (e.g., processor 402), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" snail accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content;" "bits," "values," "elements," "symbols," "characters," "terms," "numbers" "numerals," or the like. These words, however, are merely convenient labels and are to be associated with appropriate physical quantities.

Unless specifically stated otherwise, discussions herein using words such as "processing," "computing," "calculating," "determining," "presenting" "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A memory device, the memory device communicatively coupled to a processor and comprising instructions which, when performed on the processor, cause the processor to perform operations comprising:

obtain content of a webpage displayed on a web browser of a user, the web browser displayed on a user interface, the webpage served by a server of a third party different than a social networking system;

parse the content using an application programming interface (API) to extract an organization from the content, the organization different than the third party;

compare, using the API, profile characteristics of the organization with profile characteristics of the user, the profile characteristics of the organization and the user stored by the social networking system;

in response to the profile characteristics of the organization matching a predetermined number of profile characteristics of the user, obtain a job posting posted by the organization from a social network database, implemented by a server of the social networking system, based on characteristics of the user that match characteristics of the job posting; and display the job posting on the web browser of the user concurrently with the webpage as displayed on the user interface.

2. The memory device of claim 1, wherein the memory device further comprises instructions which cause the processor to:

obtain social network information related to the organization, including secondary organization different than the organization but related to the organization;

wherein obtaining the job posting is further based on the secondary organization.

3. The memory device of claim 2, wherein the social network information is obtained based on a popularity of the social network information.

4. The memory device of claim 3, wherein the popularity of the social network information is based on a rating of a previous user of the social network information.

5. The memory device of claim 2 wherein the social network information is displayed on the browser concurrently with the webpage.

6. The memory device of claim 5, wherein displaying the social network information comprises displaying the webpage in a first frame of the web browser and the social network information in a second frame of the web browser.

7. A system comprising:

a memory device, communicatively coupled to a processor and comprising instructions which, when performed on the processor, cause the processor to perform operations comprising:

obtain content of a webpage displayed on a web browser of a user, the web browser displayed on a user interface, the webpage served by a server of a third party different than a social networking system;

parse the content using an application programming interface (API) to extract an organization from the content, the organization different than the third party;

compare, using the API, profile characteristics of the organization with profile characteristics of the user, the profile characteristics of the organization and the user stored by the social networking system;

in response to the profile characteristics of the organization matching a predetermined number of profile characteristics of the user, obtain a job posting posted by the organization from a social network database, implemented by a server of the social networking system, based on characteristics of the user that match characteristics of the job posting; and display the job posting on the web browser of the user concurrently with the webpage as displayed on the user interface.

8. The system of claim 7, wherein the memory device further comprises instructions which cause the processor to:

obtain social network information related to the organization, including a secondary organization different than the organization but related to the organization;

wherein obtaining the job posting is further based on the secondary organization.

9. The system of claim 8, wherein the social network information is obtained based on a popularity of the social network information.

10. The system of claim 9, wherein the popularity of the social network information is based on a rating of a previous user of the social network information.

11. The system of claim 8 wherein the social network information is displayed on the browser concurrently with the webpage.

12. The system of claim 11, wherein displaying the social network information comprises displaying the webpage in a first frame of the web browser and the social network information in a second frame of the web browser.

13. A method for displaying social network information, comprising:

obtaining, with a processor, content of a webpage displayed on a web browser of a user, the web browser displayed on a user interface, the webpage served by a server of a third party different than a social networking system;

parsing, with the processor, the content using an application programming interface (API) to extract an organization from the content, the organization different than the third party;

comparing, with the processor, using the API, profile characteristics of the organization with profile characteristics of the user, the profile characteristics of the organization and the user stored by the social networking system;

in response to the profile characteristics of the organization matching a predetermined number of profile characteristics of the user, obtaining, with the processor, a job posting posted by the organization from a social network database, implemented by a server of the social networking system, based on characteristics of the user that match characteristics of the job posting; and displaying, with the processor, the job posting on the web browser of the user concurrently with the webpage as displayed on the user interface.

14. The method of claim 13, further comprising:

obtaining social network information related to the organization, including a secondary organization different than the organization but related to the organization;

wherein obtaining the job posting is further based on the secondary organization.

15. The method of claim 14, wherein the social network information is obtained based on a popularity of the social network information.

16. The method of claim 15, wherein the popularity of the social network information is based on a rating of a previous user of the social network information.

17. The method of claim 14, wherein the social network information is displayed on the browser concurrently with the webpage.

18. The method of claim 17, wherein displaying the social network information comprises displaying the webpage in a first frame of the web browser and the social network information in a second frame of the web browser.

19. The system of claim 7, further comprising the processor and an electronic data storage including the social network database.

* * * * *